United States Patent
Hoshi et al.

(10) Patent No.: US 7,268,186 B2
(45) Date of Patent: Sep. 11, 2007

(54) SHEET FOR CARRIER TAPE

(75) Inventors: Susumu Hoshi, Kanagawa (JP); Fumio Sugeno, Kanagawa (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 10/569,052

(22) PCT Filed: Aug. 20, 2004

(86) PCT No.: PCT/JP2004/011966

§ 371 (c)(1),
(2), (4) Date: Feb. 22, 2006

(87) PCT Pub. No.: WO2005/019060

PCT Pub. Date: Mar. 3, 2005

(65) Prior Publication Data

US 2006/0222794 A1     Oct. 5, 2006

(30) Foreign Application Priority Data

Aug. 22, 2003  (JP) .............................. 2003-298214

(51) Int. Cl.
   *C08L 53/02*  (2006.01)
   *C08L 25/14*  (2006.01)
(52) U.S. Cl. ........................... 525/99; 525/80; 525/87; 525/93; 428/521
(58) Field of Classification Search ................ 525/80, 525/87, 99, 93; 428/521
See application file for complete search history.

(56) References Cited

U.S. PATENT DOCUMENTS 6,235,847 B1 *  5/2001  Hoshi et al. ................. 525/314
6,660,790 B1 * 12/2003  Hoshi et al. ................. 524/291

FOREIGN PATENT DOCUMENTS

| JP | 7-179696 | 7/1995 |
| JP | 10-279755 | 10/1998 |
| JP | 2001-191461 | 7/2001 |
| JP | 2002-331621 | 11/2002 |

* cited by examiner

*Primary Examiner*—Fred Teskin
(74) *Attorney, Agent, or Firm*—Staas & Halsey LLP

(57) ABSTRACT

The present invention relates to a sheet for a carrier tape, having at least one layer comprising (I) a block copolymer comprising a vinyl aromatic hydrocarbon and a conjugated diene, (II) a non-rubber-modified vinyl aromatic type hydrocarbon polymer, and (III) a rubber-modified vinyl aromatic type hydrocarbon polymer, wherein the peak molecular weight of the vinyl aromatic hydrocarbon polymer block in the block copolymer (I) is from 30,000 to 80,000, the half-width in the molecular weight distribution curve of the vinyl aromatic hydrocarbon block is from 1.3 to 2.8, the vinyl aromatic hydrocarbon content in the sheet for a carrier tape is from 75 to 95 wt %, and the content of the vinyl aromatic hydrocarbon polymer component is from 65 to 85 wt %.

The sheet for a carrier tape of the present invention is transparent and excellent in the balance of physical properties such as rigidity, impact resistance and heat shrinkability, and therefore, can be suitably used for a carrier tape for packaging an electronic component (e.g., IC, LSI) in an electronic device.

7 Claims, No Drawings

SHEET FOR CARRIER TAPE

This application is based on and hereby claims priority to PCT Application No. PCT/JP2004/011966 filed on Aug. 20, 2004 and Japanese Application No. 2003-298214 filed on Aug. 22, 2003, the contents of which are hereby incorporated by reference.

TECHNICAL FIELD

The present invention relates to a sheet excellent in the thermal stability and balance of physical properties suitable for a carrier tape, such as rigidity, transparency, impact resistance and heat shrinkability.

BACKGROUND ART

The carrier tape for packaging an electronic component such as IC and LSI in an electronic device is conventionally formed from a sheet comprising a vinyl chloride resin, a styrene-based resin or the like. For example, as for the styrene-based resin, a sheet obtained by mixing a general-purpose polystyrene resin and a styrene-butadiene block copolymer is used. In view of the form on use, the carrier tape is required to have a good balance of physical properties such as transparency, rigidity, impact resistance, bending resistance and shapability, and various studies have been heretofore made to enhance these properties and obtain a good balance thereof.

For example, Patent Document 1 discloses a styrene-based resin composition comprising a block copolymer comprising a vinyl aromatic hydrocarbon and a conjugated diene, a vinyl aromatic hydrocarbon-acrylic acid ester copolymer, and a rubber-modified impact-resistant polystyrene-based resin, for obtaining a styrene-based resin suitable for a transparent carrier tape excellent in the transparency, rigidity and impact resistance.

Patent Document 2 discloses an embossed carrier tape comprising an alloy of a polystyrene resin with a styrene-diene-based elastomer copolymer, for obtaining an embossed carrier tape free from generation of a problem such as whitening or cracking at the bending.

Patent Document 3 discloses a sheet which contains a polystyrene-based resin and a rubber-reinforced styrene-based resin on both surfaces of a substrate layer comprising a styrene-butadiene copolymer and a polystyrene-based resin, for obtaining a molded article for the transportation of an electronic component, which is formed of a sheet excellent in the buckling strength, impact resistance, rigidity, printing suitability and heat-sealing property.

Patent Document 4 discloses a sheet having a constitution such that an outer layer formed of a resin composition comprising a styrene-based resin and a styrene-butadiene block copolymer is provided on both surfaces of a substrate layer comprising a styrene-based thermoplastic elastomer and a styrene-based resin, for obtaining a styrene-based resin sheet excellent in the bending strength, buckling strength, impact resistance and rigidity, which comprises a plurality of resin layers integrally stacked and uniform in the thickness, and also for obtaining a molded article for the transportation of an electronic component, which is formed of the sheet.

Patent Document 5 discloses a sheet having a surface layer comprising a styrene-conjugated diene block copolymer and a styrene-based resin, on at least one surface of a substrate layer comprising a styrene-based resin or a styrene-conjugated diene block copolymer and a styrene-based resin, for obtaining a sheet excellent in the transparency, shapability and rigidity.

Patent Document 6 discloses a resin composition comprising a specific styrene-conjugated block copolymer and a polystyrene-based resin, and a sheet comprising the resin composition, for obtaining a resin composition and a sheet, which are excellent in the shapability and transparency.

Patent Document 7 discloses a resin composition comprising a rubber component-containing styrene-based resin and a styrene-conjugated diene block copolymer, and a sheet comprising the resin composition, for obtaining a resin composition suitable for electronic component packaging and excellent in the transparency, shapability and impact strength and also for obtaining a sheet using the same.

However, these resin compositions comprising a block copolymer which comprises a vinyl aromatic hydrocarbon and a conjugated diene, and a vinyl aromatic hydrocarbon-based polymer are insufficient in the thermal stability and balance of physical properties suitable for a carrier tape, such as rigidity, transparency, impact resistance and heat shrinkability, and a method for improving such a problem is not disclosed in those publications. The problem is still pointed out on the market.

Patent Document 1: JP-A-10-279755
Patent Document 2: JP-A-10-236576
Patent Document 3: JP-A-2002-113818
Patent Document 4: JP-A-2002-283502
Patent Document 5: JP-A-2002-331621
Patent Document 6: JP-A-2002-332392
Patent Document 7: JP-A-2003-55526

DISCLOSURE OF THE INVENTION

An object of the present invention is to provide a sheet excellent in the thermal stability and balance of physical properties suitable for a carrier tape, such as rigidity, transparency, impact resistance and heat shrinkability.

As a result of extensive investigations, the present inventors have found the above-described object can be attained by a specific composition using a specific block copolymer. The present invention has been accomplished based on this finding. That is, the constitutions of the present invention are as follows.

[1] A sheet for a carrier tape, having at least one layer comprising (I) a block copolymer comprising a vinyl aromatic hydrocarbon and a conjugated diene, (II) a non-rubber-modified vinyl aromatic type hydrocarbon polymer, and (III) a rubber-modified vinyl aromatic type hydrocarbon polymer, wherein the vinyl aromatic hydrocarbon polymer block in the block copolymer (I) has a peak molecular weight of from 30,000 to 80,000, and the vinyl aromatic hydrocarbon block has a half-width in its molecular weight distribution curve of from 1.3 to 2.8, the sheet for a carrier tape has a vinyl aromatic hydrocarbon content of from 75 to 95 wt % and a vinyl aromatic hydrocarbon polymer component content of from 65 to 85 wt %.

[2] The sheet for a carrier tape as described in [1] above, wherein the peak molecular weight of the vinyl aromatic hydrocarbon polymer block in the block copolymer (I) is from 32,000 to 75,000, the half-width in the molecular weight distribution curve of the vinyl aromatic hydrocarbon block is from 1.5 to 2.5, the vinyl aromatic hydrocarbon content in the sheet for a carrier tape is from 77 to 92 wt %, and the content of the vinyl aromatic hydrocarbon polymer component is from 68 to 82 wt %.

[3] The sheet for a carrier tape as described in [1] or [2] above, wherein the contents of the block copolymer (I), the non-rubber-modified vinyl aromatic type hydrocarbon polymer (II) and the rubber-modified vinyl aromatic type hydrocarbon polymer (III) are, assuming that the total is 100 parts by weight, from 30 to 90 parts by weight, from 5 to 60 parts by weight, and from 1 to 30 parts by weight, respectively.

[4] The sheet for a carrier tape as described in any one of [1] to [3] above, wherein the block copolymer (I) has a vinyl aromatic hydrocarbon content of from 65 to 90 wt % and a conjugated diene content of from 10 to 35 wt %.

[5] The sheet for a carrier tape as described in any one of [1] to [4] above, wherein the conjugated diene of the block copolymer (I) comprises butadiene and isoprene, and the weight ratio of the butadiene and the isoprene is from 10/90 to 80/20.

[6] The sheet for a carrier tape as described in any one of [1] to [5] above, wherein the non-rubber-modified vinyl aromatic type hydrocarbon polymer (II) is a styrene/n-butyl acrylate copolymer (IV) having a styrene monomer unit content of 75 to 90 wt % and an n-butyl acrylate monomer unit content of 25 to 10 wt %.

[7] A carrier tape formed of the sheet described in any one of [1] to [6] above.

The sheet for a carrier tape of the present invention is assured of thermal stability and balance of physical properties suitable for a carrier tape, such as rigidity, transparency, impact resistance and heat shrinkability.

BEST MODE FOR CARRYING OUT THE INVENTION

The present invention is described in detail below.

The sheet for a carrier tape of the present invention, having at least one layer comprising (I) a block copolymer comprising a vinyl aromatic hydrocarbon and a conjugated diene, (II) a non-rubber-modified vinyl aromatic type hydrocarbon polymer, and (III) a rubber-modified vinyl aromatic type hydrocarbon polymer (hereinafter referred to as a "sheet of the present invention"), has a vinyl aromatic hydrocarbon content of 75 to 95 wt %, preferably from 77 to 92 wt %, more preferably from 80 to 90 wt %. When the vinyl aromatic hydrocarbon content is 75 wt % or more, a sheet excellent in the transparency and rigidity can be obtained, and when this content is 95 wt % or less, a sheet enhanced in the impact resistance can be obtained.

The vinyl aromatic hydrocarbon content in the sheet of the present invention can be elevated, for example, by increasing the vinyl aromatic hydrocarbon content of the block copolymer (I) or by increasing the blending amount of the non-rubber-modified vinyl aromatic type hydrocarbon polymer (II) or the rubber-modified vinyl aromatic type hydrocarbon polymer (III) according to the purpose. In the case of lowering the content, this can be controlled by reversing the above-described operation.

The content of the vinyl aromatic hydrocarbon polymer component in the sheet of the present invention is from 65 to 85 wt %, preferably from 68 to 82 wt %, more preferably from 70 to 80 wt %. When the content of the vinyl aromatic hydrocarbon polymer component is 65 wt % or more, a sheet having excellent rigidity can be obtained, and when this content is 85 wt % or less, a sheet having good impact resistance can be obtained.

The content of the vinyl aromatic hydrocarbon polymer component in the sheet of the present invention is a content of the vinyl aromatic hydrocarbon polymer block component (excluding a vinyl aromatic hydrocarbon polymer component having an average polymerization degree of about 30 or less) in the sheet, as measured by a method of oxidatively decomposing the sheet with a tert-butyl hydroperoxide by using osmium tetroxide as the catalyst (the method described in I. M. KOLTHOFF, et al., *J. Polym. Sci.*, 1, 429 (1946)). The content of the vinyl aromatic hydrocarbon polymer component in the sheet can be elevated, for example, by increasing the content of the vinyl aromatic hydrocarbon block of the block copolymer (I) or by increasing the blending amount of the non-rubber-modified vinyl aromatic type hydrocarbon polymer (II) or the rubber-modified vinyl aromatic type hydrocarbon polymer (III) according to the purpose. In the case of lowering the content, this can be controlled by reversing the above-described operation. Incidentally, the content of the vinyl aromatic hydrocarbon block of the block copolymer (I) can be controlled by the method described later.

The weight ratio of the block copolymer (I), the non-rubber-modified vinyl aromatic type hydrocarbon polymer (II) and the rubber-modified vinyl aromatic type hydrocarbon polymer (III) in the sheet of the present invention is, assuming that the total is 100 parts by weight, (I)/(II)/(III) =30-90/5-60/1-30, preferably 35-85/10-55/3-25, more preferably 40-80/15-50/5-20. When the weight ratio is in the range of (I)/(II)/(III)=30-90/5-60/1-30, the rigidity, transparency, impact resistance, shrinkability and the like are excellent.

The block copolymer (I) for use in the present invention has a vinyl aromatic hydrocarbon content of 65 to 90 wt % and a conjugated diene content of 10 to 35 wt %, preferably a vinyl aromatic hydrocarbon content of 68 to 85 wt % and a conjugated diene content of 15 to 32 wt %, more preferably a vinyl aromatic hydrocarbon content of 70 to 80 wt % and a conjugated diene content of 20 to 30 wt %. When the vinyl aromatic hydrocarbon content is from 65 to 90 wt % and the conjugated diene content is from 10 to 35 wt %, the rigidity, transparency and impact resistance are excellent.

The vinyl aromatic hydrocarbon polymer block of the block copolymer (I) for use in the present invention has a peak molecular weight of 30,000 to 80,000, preferably from 32,000 to 75,000, more preferably from 35,000 to 70,000. When the peak molecular weight is from 30,000 to 80,000, the impact resistance, rigidity and heat shrinkability are excellent.

The peak molecular weight of the vinyl aromatic hydrocarbon polymer block of the block copolymer (I) for use in the present invention is a molecular weight as specified by gel permeation chromatography (GPC) of a vinyl aromatic hydrocarbon polymer block component which is obtained by a method of, before hydrogenation of the block copolymer (I), oxidatively decomposing the copolymer with a tert-butyl hydroperoxide by using osmium tetroxide as the catalyst (the method described in I. M. KOLTHOFF, et al., *J. Polym. Sci.*, 1, 429 (1946), hereinafter sometimes referred to as an "osmium tetroxide acid method"). In the determination of the molecular weight, a monodisperse polystyrene for gel permeation chromatography (GPC) is measured by GPC, a calibration curve is drawn based on the peak count number and the number average molecular weight of the monodisperse polystyrene, and the molecular weight is calculated according to a normal method (see, for example, *Gel Chromatography <Kiso Hen (Basic Edition)>*, Kodan Sha). The peak molecular weight of the vinyl aromatic hydrocarbon polymer block can be controlled by varying, for example, the weight of vinyl aromatic hydrocarbon, the weight ratio between vinyl aromatic hydrocarbon and conjugated diene, or the molecular weight of block copolymer.

The molecular weight distribution curve of the vinyl aromatic hydrocarbon polymer block of the block copolymer (I) for use in the present invention has a half-width of 1.3 to 2.8, preferably from 1.5 to 2.5, more preferably from 1.7 to 2.3. When the half-width of the molecular weight distribution curve of the vinyl aromatic hydrocarbon polymer block is from 1.3 to 2.8, the impact resistance and heat shrinkability are excellent. The half-width of the molecular weight distribution curve of the vinyl aromatic hydrocarbon polymer block can be determined from a molecular weight distribution chart used for determining the above-described peak molecular weight of the vinyl aromatic hydrocarbon polymer block. More specifically, the molecular weight in the logarithmic indication is taken on the abscissa by assigning a length of 15 cm to the range from 1,000 to 1,000,000, the concentration (weight ratio) with an arbitrary height is indicated on the ordinate, and the width on the abscissa of the peak at 50% of the peak top height is defined as the half-width. In this case, it is necessary that the peak top height is perpendicular to the abscissa and the width of the peak at 50% of the peak top height is horizontal with the abscissa. The half-width of the molecular weight distribution curve of the vinyl aromatic hydrocarbon polymer block can be controlled by varying, for example, the weight of vinyl aromatic hydrocarbon or the molecular weight distribution of block copolymer, but the half-width is preferably controlled by a method of adding an initiator multiple times or continuously at the production of the vinyl aromatic hydrocarbon polymer block moiety (segment A described later), or a method of blending block copolymers differing in the molecular weight.

The block copolymer (I) for use in the present invention has at least one segment which comprises a vinyl aromatic hydrocarbon homopolymer and/or a copolymer comprising a vinyl aromatic hydrocarbon and a conjugated diene, and at least one segment which comprises a conjugated diene homopolymer and/or a copolymer comprising a vinyl aromatic hydrocarbon and a conjugated diene. The block copolymer and the like are not particularly limited in the polymer structure, but, for example, a linear block copolymer or a radical block copolymer represented by any one of the following formulae (1) to (7), or an arbitrary mixture of these polymer structures, can be used.

$$(A-B)_n \qquad (1)$$

$$A-(B-A)_n \qquad (2)$$

$$B-(A-B)_{n+1} \qquad (3)$$

$$[(A-B)_k]_{m+1}-X \qquad (4)$$

$$[A-B)_k-A]_{m+1}-X \qquad (5)$$

$$[(B-A)_k]_{m+1}-X \qquad (6)$$

$$[(B-A)_k-B]_{m+1}-X \qquad (7)$$

(wherein the segment A is a vinyl aromatic hydrocarbon homopolymer and/or a copolymer comprising a vinyl aromatic hydrocarbon and a conjugated diene; the segment B is a conjugated diene homopolymer and/or a copolymer comprising a vinyl aromatic hydrocarbon and a conjugated diene; X represents a residue of a coupling agent such as silicon tetrachloride, tin tetrachloride, 1,3-bis(N,N-glycidyl-aminomethyl)cyclohexane and epoxidized soybean oil, or a residue of an initiator such as polyfunctional organolithium compound; n, k and m each is an integer of 1 or more, generally an integer of 1 to 5; and a plurality of polymer chains bonded to X may have the same or different structures).

Also, in the radial block copolymers represented by formulae above, at least one A and/or B may be further bonded to X.

In the present invention, the vinyl aromatic hydrocarbon of the copolymer comprising a vinyl aromatic hydrocarbon and a conjugated diene in the segment A and the segment B may be uniformly distributed or may be distributed in the tapered (gradually decreased) state. Also, in the copolymer, a plurality of portions having a uniform distribution of the vinyl aromatic hydrocarbon and/or a plurality of portions having a tapered distribution of the vinyl aromatic hydrocarbon may be present together. As for the relationship between the vinyl aromatic hydrocarbon content in the segment A ({vinyl aromatic hydrocarbon in segment A/(vinyl aromatic hydrocarbon+conjugated diene in segment A)}×100) and the vinyl aromatic hydrocarbon content in the segment B ({vinyl aromatic hydrocarbon in segment B/(vinyl aromatic hydrocarbon+conjugated diene in segment B)×100), the vinyl aromatic hydrocarbon content in the segment A is larger than the vinyl aromatic hydrocarbon content in the segment B. The difference in the vinyl aromatic hydrocarbon content between the segment A and the segment B is preferably 5 wt % or more.

The content of the vinyl aromatic hydrocarbon polymer block of the block copolymer (I) for use in the present invention can be controlled by varying, for example, the amount of the vinyl aromatic hydrocarbon used at the production and/or the weight, weight ratio or polymerization reactivity ratio of the vinyl aromatic hydrocarbon and the conjugated diene in the process of the vinyl aromatic hydrocarbon and the conjugated diene being copolymerized.

With respect to the specific method for the latter, for example, a method of polymerizing a vinyl aromatic hydrocarbon and a conjugated diene by continuously supplying a mixture thereof to the polymerization system and/or a method of copolymerizing a vinyl aromatic hydrocarbon and a conjugated diene by using a polar compound or a randomizing agent, may be employed.

Examples of the polar compound and the randomizing agent include ethers such as tetrahydrofuran, diethylene glycol dimethyl ether and diethylene glycol dibutyl ether, amines such as triethylamine and tetramethylethylenediamine, thioethers, phosphines, phosphoramides, alkylbenzenesulfonates, and potassium and sodium alkoxides.

The block copolymer (I) for use in the present invention has a number average molecular weight (polystyrene-reduced molecular weight) of 30,000 to 500,000, preferably from 50,000 to 400,000, more preferably from 70,000 to 300,000, as measured by gel permeation chromatography (GPC), and may be a mixture of a plurality of block copolymers differing in the molecular weight. In view of shaping processability, the melt flow index (as measured according to JIS K-6870 under Condition G at a temperature of 200° C. with a load of 5 Kg) of the block copolymer is preferably from 0.1 to 100 g/10 min, more preferably from 0.5 to 50 g/10 min, still more preferably from 1 to 30 g/10 min. The molecular weight and the melt flow index can be arbitrarily adjusted by the amount of the catalyst used for the polymerization.

The block copolymer (I) for use in the present invention can be obtained by polymerizing a vinyl aromatic hydrocarbon and a conjugated diene in a hydrocarbon solvent in the presence of an organolithium compound as the initiator. Examples of the vinyl aromatic hydrocarbon for use in the present invention include styrene, o-methylstyrene, p-methylstyrene, p-tert-butylstyrene, 1,3-dimethylstyrene, α-methylstyrene, vinylnaphthalene, vinylanthracene, 1,1-diphenylethylene, N,N-dimethyl-p-aminoethylstyrene and N,N-diethyl-p-aminoethylstyrene. In particular, styrene is generally used. These hydrocarbons may be used individually or in combination of two or more thereof.

Examples of the conjugated diene include a diolefin having a pair of conjugated double bonds, such as 1,3-butadiene, 2-methyl-1,3-butadiene (isoprene), 2,3-dimethyl-1,3-butadiene, 1,3-pentadiene and 1,3-hexadiene. In particular, 1,3-butadiene and isoprene are generally used. These dienes may be used individually or in combination of two or more thereof.

The conjugated diene of the block copolymer (I) for use in the present invention preferably comprises butadiene and isoprene, and the weight ratio of butadiene to isoprene is from 10/90 to 80/20, preferably from 20/80 to 75/25, more preferably from 30/70 to 70/30. When the weight ratio of butadiene to isoprene is from 10/90 to 80/20, the thermal stability is excellent.

The block copolymer (I) for use in the present invention is obtained, for example, by the anion living polymerization using an initiator such as organic alkali metal compound in a hydrocarbon solvent. Examples of the hydrocarbon solvent which can be used include aliphatic hydrocarbons such as n-butane, isobutane, n-pentane, n-hexane, n-heptane and n-octane; alicyclic hydrocarbons such as cyclopentane, methylcyclopentane, cyclohexane, methylcyclohexane, cycloheptane and methylcycloheptane; and aromatic hydrocarbons such as benzene, toluene, xylene and ethylbenzene. These solvents may be used individually or in combination of two or more thereof.

With respect to the polymerization initiator, for example, an aliphatic hydrocarbon alkali metal compound, an aromatic hydrocarbon alkali metal compound and an organic amino alkali metal compound, which are generally known to have an anion polymerization activity for a conjugated diene and a vinyl aromatic compound, may be used.

Examples of the alkali metal include lithium, sodium and potassium. The organic alkali metal compound is suitably an aliphatic or aromatic hydrocarbon lithium compound having a carbon number of 1 to 20 and containing one lithium within one molecule or containing a plurality of lithiums within one molecule, such as dilithium compound, trilithium compound and tetralithium compound.

Specific examples thereof include n-propyllithium, n-butyllithium, sec-butyllithium, tert-butyllithium, hexa-methylenedilithium, butadienyldilithium, isoprenyldilithium, a reaction product of diisopropenylbenzene and sec-butyllithium, and a reaction product of divinylbenzene and sec-butyllithium with a slight amount of 1,3-butadiene. Furthermore, organic alkali metal compounds disclosed in U.S. Pat. No. 5,708,092, British Patent 2,241,239 and U.S. Pat. No. 5,527,753 may also be used. These compounds may be used individually or in combination of two or more thereof.

In the present invention, the polymerization temperature at the production of the block copolymer is generally from −10 to 150° C., preferably from 40 to 120° C. The time necessary for the polymerization varies depending on the conditions but is usually within 10 hours, preferably from 0.5 to 5 hours. The atmosphere of the polymerization system is preferably displaced with an inert gas such as nitrogen gas. The polymerization pressure is not particularly limited, and the polymerization may be performed under a pressure sufficiently high to maintain the liquid phase of the monomer and solvent in the above-described polymerization temperature range. Furthermore, it must be noted that impurities which inactivate the catalyst and the living polymer, such as water, oxygen and carbonic acid gas, are prevented from mingling into the polymerization system.

The block copolymer (I) for use in the present invention may be hydrogenated and used as a hydrogenated product, if desired. The hydrogenation catalyst for obtaining a hydrogenated product of the block copolymer (I) is not particularly limited, and the following conventionally known hydrogenation catalysts may be used: (1) a heterogeneous supported hydrogenation catalyst comprising a metal (e.g., Ni, Pt, Pd, Ru) having supported thereon carbon, silica, alumina, diatomaceous earth or the like; (2) a so-called Ziegler-type hydrogenation catalyst using a transition metal salt such as organic acid salt or acetylacetone salt of Ni, Co, Fe, Cr or the like and a reducing agent (e.g., organoaluminum); and (3) a homogeneous hydrogenation catalyst such as so-called organometal complex of an organometal compound containing Ti, Ru, Rh, Zr or the like. Specific examples of the hydrogenation catalyst which can be used include hydrogenation catalysts described in JP-B-42-8704, JP-B-43-6636, JP-B-63-4841, JP-B-1-37970, JP-B-1-53851 and JP-B-2-9041. Preferred examples of the hydrogenation catalyst include a titanocene compound and/or a mixture with a reducing organometal compound.

As for the titanocene compound, a compound described in JP-A-8-109219 may be used, but specific examples thereof include a compound containing at least one ligand having a (substituted) cyclopentadienyl skeleton, an indenyl skeleton or a fluorenyl skeleton, such as biscyclopenta-dienyltitanium dichloride and monopentamethylcyclopenta-dienyltitanium trichloride. Examples of the reducing organometal compound include an organic alkali metal compound such as organolithium, an organomagnesium compound, an organoaluminum compound, an organoboron compound and an organozinc compound.

The hydrogenation reaction is generally performed at a temperature of 0 to 200° C., preferably from 30 to 150° C. The hydrogen pressure for use in the hydrogenation reaction is from 0.1 to 15 MPa, preferably from 0.2 to 10 MPa, more preferably from 0.3 to 7 MPa. The hydrogenation reaction time is generally from 3 minutes to 10 hours, preferably from 10 minutes to 5 hours. The hydrogenation reaction may be performed in a batch process, a continuous process or a combination thereof.

In the hydrogenated product of the block copolymer (I) for use in the present invention, the hydrogenation ratio of the unsaturated double bond based on the conjugated diene may be arbitrarily selected according to the purpose and is not particularly limited.

In the case of obtaining a hydrogenated block copolymer with good thermal stability and weather resistance, it is recommended that more than 70%, preferably 75% or more, more preferably 85% or more, still more preferably 90% or more, of the unsaturated double bond based on the conjugated diene compound in the polymer is hydrogenated.

Also, in the case of obtaining a hydrogenated block copolymer with good thermal stability, the hydrogenation ratio is preferably from 3 to 70%, more preferably from 5 to 65%, still more preferably from 10 to 60%. Incidentally, the hydrogenation ratio of the aromatic double bond based on the vinyl aromatic hydrocarbon in the copolymer is not particularly limited, but the hydrogenation is preferably 50% or less, more preferably 30% or less, still more preferably 20% or less. The hydrogenation ration can be determined by a nuclear magnetic resonance (NMR) apparatus.

In the present invention, when a hydrogenated product of the block copolymer (I) is used, the content of the vinyl aromatic hydrocarbon polymer component in the hydrogenated product can be determined by the above-described method of oxidatively decomposing the block copolymer before hydrogenation.

The microstructure (the ratio of cis, trans and vinyl) in the conjugated diene moiety of the block copolymer (I) for use in the present invention can be freely varied by using the below-described polar compound or the like and is not particularly limited. Generally, the vinyl bond amount is from 5 to 90%, preferably from 10 to 80%, more preferably from 15 to 75%. The vinyl bond amount as used in the present invention is a total amount of 1,2-vinyl bond and 3,4-vinyl bond (however, when 1,3-butadiene is used as the conjugated diene, a 1,2-vinyl bond amount). The vinyl bond amount can be determined by a nuclear magnetic resonance (NMR) apparatus.

The non-rubber-modified vinyl aromatic type hydrocarbon polymer (II) for use in the present invention is obtained by polymerizing a vinyl aromatic hydrocarbon alone or together with a monomer copolymerizable therewith. Examples of the monomer copolymerizable with a vinyl aromatic hydrocarbon include an α-methylstyrene, an acrylonitrile, an acrylic acid ester, a methacrylic acid ester and a maleic anhydride. Particularly preferred examples of the non-rubber-modified vinyl aromatic hydrocarbon polymer (II) include a polystyrene, an acrylic acid ester-styrene copolymer and a methacrylic acid ester-styrene copolymer, and these may be used individually or as a mixture of two or more thereof.

The rubber-modified vinyl aromatic type hydrocarbon polymer (III) for use in the present invention is obtained by polymerizing a mixture containing a vinyl aromatic hydrocarbon, a monomer copolymerizable therewith and an elastomer. As for the polymerization method, suspension polymerization, emulsion polymerization, bulk polymerization, bulk-suspension polymerization and the like are generally performed.

Examples of the monomer copolymerizable with a vinyl aromatic hydrocarbon include an α-methylstyrene, an acrylonitrile, an acrylic acid ester, a methacrylic acid ester and a maleic anhydride. Examples of the copolymerizable elastomer include natural rubber, synthetic isoprene rubber, butadiene rubber, styrene-butadiene rubber and high styrene rubber.

This elastomer used for the emulsion polymerization, bulk polymerization, bulk-suspension polymerization or the like is added in an amount of generally from 3 to 50 parts by weight per 100 parts by weight of the vinyl aromatic hydrocarbon and the monomer copolymerizable therewith by dissolving it in the monomer or in the latex state. Preferred examples of the rubber-modified vinyl aromatic type hydrocarbon polymer include an impact-resistant rubber-modified styrene polymer (HIPS). As for the weight average molecular weight of the rubber-modified aromatic type hydrocarbon polymer, a polymer having a weight average molecular weight of 50,000 to 500,000 may be generally used.

In an embodiment of the sheet of the present invention, a sheet having at least one layer comprising (I) a block copolymer in which the conjugated diene comprises butadiene and isoprene and the weight ratio of butadiene to isoprene is from 10/90 to 80/20, (IV) a styrene-n-butyl acrylate copolymer, and (III) a rubber-modified vinyl aromatic type hydrocarbon polymer may be used.

The styrene/n-butyl acrylate copolymer (IV) for use in the present invention may be produced by a known method for the production of a styrene-based resin, such as bulk polymerization method, solution polymerization method, suspension polymerization method or emulsion polymerization method. The styrene/n-butyl acrylate copolymer (IV) has a styrene content of 75 to 90 wt % and an n-butyl acrylate monomer unit content of 25 to 10 wt %, preferably a styrene content of 78 to 87 wt % and an n-butyl acrylate monomer unit content of 22 to 13 wt %. When the styrene content is from 75 to 90 wt % and the n-butyl acrylate monomer unit content is from 25 to 10 wt %, the rigidity, transparency and impact resistance are excellent.

The blending amount in the sheet of the present invention comprising (I) a block copolymer in which the conjugated diene comprises butadiene and isoprene, (IV) a styrene/n-butyl acrylate copolymer, and (III) a rubber-modified vinyl aromatic type hydrocarbon polymer is, assuming that the total is 100 parts by weight, preferably (I)/(IV)/(III)=30-90/5-60/1-30, more preferably 35-85/10-55/3-25, still more preferably 40-80/15-50/5-20. When the blending amount is in the range of (I)/(IV)/(III)=30-90/5-60/1-30, the rigidity, transparency, impact resistance, heat shrinkability and the like are excellent.

The thickness of the sheet of the present invention is not particularly limited but is approximately from 10 μm to 2 mm, preferably from 50 μm to 1 mm, more preferably from 100 to 500 μm. The production method of the sheet is not particularly limited, but, for example, a resin composition prepared in a kneading machine such as kneader, Banbury mixer and roll or in a mixing machine such as ribbon blender and Henschel mixer is supplied to a single- or twin-screw extruder, melt-kneaded under heat and then extruded from a die (e.g., flat die, T-die, cylindrical die), whereby the sheet can be shaped. The sheet may be uniaxially or biaxially stretched but is usually an unstretched sheet obtained by setting withdrawal to act in the extrusion direction.

The sheet of the present invention has at least one layer comprising (I) a block copolymer, (II) a non-rubber-modified vinyl aromatic type hydrocarbon polymer and (III) a rubber-modified vinyl aromatic type hydrocarbon polymer. For example, in the case of obtaining a sheet having a plurality of layers, the sheet may be produced by a heat lamination method where the compositions used for respective constituent layers are shaped in a plurality of extruders and the obtained sheets are stacked under heat and integrated, or may be produced by a method where the resin compositions for respective constituent layers are co-extruded by using a general-purpose die with feed block, a multi-manifold die or the like. The method of co-extruding the resin compositions is preferred, because a thin surface layer can be obtained and the mass productivity is excellent.

The sheet obtained in this way can be easily secondary-formed into a carrier tape by a commonly employed thermoforming such as air-pressure forming (e.g., extrusion air-pressure forming, hot-plate air-pressure forming, vacuum air-pressure forming), free blow forming, vacuum forming, folding, match mold forming and hot-plate forming.

The sheet or secondary formed product may be surface-treated (for example, a discharge treatment such as corona discharge or glow discharge, an acid treatment or a flame treatment). The sheet or secondary formed product has excellent printability and therefore, an electrically conducting film or an antistatic layer (for example, a film by an electrically conducting ink) may be formed on the surface thereof. The sheet is excellent in the printability and heat-seal property, so that a high antistatic performance can be imparted and a good heat-seal property with a cover tape can be ensured. Accordingly, the sheet is useful, for example, as a molded article for the transportation of a semiconductor or an electronic component, particularly, a carrier tape having a recessed portion for housing an electronic component, which is sealed with a cover tape to house an electronic component.

In the sheet of the present invention, various polymers and additives may be added according to the purpose. Suitable examples of the polymer include a block copolymer elastomer of a vinyl aromatic hydrocarbon and a conjugated diene, and a hydrogenated product thereof. The block copolymer elastomer of a vinyl aromatic hydrocarbon and a conjugated diene, or a hydrogenated product thereof has a vinyl aromatic hydrocarbon content of less than 60 wt %, preferably from 10 to 50 wt %, and is blended in an amount of 0.5 to 30 parts by weight, preferably from 1 to 20 parts by weight, per 100 parts by weight of the block copolymer (I), whereby the impact resistance can be improved.

In the hydrogenated block copolymer elastomer, the hydrogenation ratio of the unsaturated double bond based on the conjugated diene may be arbitrarily selected according to the purpose and is not particularly limited. It is possible that 70% or more, preferably 80% or more, more preferably 90% or more, of the unsaturated double bond based on the conjugated diene in the block copolymer elastomer is hydrogenated or only a part is hydrogenated. In the case of hydrogenating only a part, the hydrogenation ratio is preferably from 10% to less than 70%, or from 15% to less than 65%, and if desired, from 20% to less than 60%.

Examples of other suitable additives include a softening agent and a plasticizer, such as coumarone-indene resin, terpene resin and oil. Also, various stabilizers, pigments, antiblocking agents, antistatic agents, lubricants and the like can be added.

Examples of the antiblocking agent, antistatic agent and lubricant which can be used include a fatty acid amide, an ethylenebisstearoamide, a sorbitan monostearate, a saturated fatty acid ester of fatty acid alcohol, and a pentaerythritol fatty acid ester; and examples of the ultraviolet absorbent which can be used include p-tert-butylphenyl salicylate, 2-(2'-hydroxy-5'-methylphenyl)-benzotriazole, 2-(2'-hydroxy-3'-tert-butyl-5'-methylphenyl)-5-chlorobenzotriazole, 2,5-bis-[5'-tert-butylbenzoxazolyl-(2)]thiophene, and compounds described in *Plastic oyobi Gomu yo Tenkazai Jitsuyo Binran (Practical Handbook of Additives for Plastic and Rubber)*, Kagaku Kogyo Sha. Such an additive is generally used in an amount of 0.01 to 5 wt %, preferably from 0.05 to 3 wt %.

EXAMPLES

The present invention will be illustrated in greater detail with reference to the following Examples, but the scope of the invention should not be construed as being limited thereto.

The block copolymer, the non-rubber-modified vinyl aromatic type hydrocarbon polymer, the rubber-modified vinyl aromatic type hydrocarbon polymer and the styrene/n-butyl acrylate copolymer are shown in Tables 1 and 2.

<Preparation of Block Copolymers A-1 to A-6>

As for the block copolymer, block copolymers each having a styrene content (wt %), a block styrene content (wt %) and a peak molecular weight of block styrene shown in Table 1 were produced by using n-butyllithium as the catalyst and tetramethylethylenediamine as the randomizing agent in a cyclohexane solvent. The styrene content is the amounts added of styrene and butadiene (in the case of further adding isoprene, including the amount of isoprene), the block styrene content is the styrene contents of the segments A and B, and the peak molecular weight of the block styrene was adjusted by the styrene contents and quantitative ratio of the segments A and B. In the preparation of the block copolymer, the monomer used was diluted with cyclohexane to a concentration of 20 wt %.

(1) Block Copolymer A-1

Using an autoclave with a stirrer, 0.03 parts by weight of tetramethylethylenediamine was added to a cyclohexane solution containing 29 parts by weight of styrene at 75° C. in a nitrogen gas atmosphere and after initiating the polymerization by continuously adding 0.056 parts by weight of n-butyllithium for 6 minutes, the polymerization was performed over 20 minutes. Subsequently, a cyclohexane solution containing 15 parts by weight of styrene and 27 parts by weight of 1,3-butadiene was continuously added for 45 minutes and polymerized at 75° C. and furthermore, a cyclohexane solution containing 29 parts by weight of styrene was added and polymerized at 75° C. for 20 minutes. Thereafter, the polymerization was stopped by adding methanol in an amount of 0.9-fold mol based on the n-butyllithium to the polymerization vessel and after adding 0.6 parts by weight of 2-[1-(2-hydroxy-3,5-di-tert-pentylphenyl)ethyl]-4,6-di-tert-pentylphenyl acrylate as the stabilizer per 100 parts by weight of the block copolymer composition, the solvent was removed to obtain a block copolymer.

(2) Block Copolymer A-6

Using an autoclave with a stirrer, 0.03 parts by weight of tetramethylethylenediamine and 0.055 parts by weight of n-butyllithium were added to a cyclohexane solution containing 38 parts by weight of styrene at 50° C. over 10 seconds in a nitrogen gas atmosphere, thereby initiating the polymerization, and then the polymerization was performed over 20 minutes. Subsequently, by setting the temperature in the polymerization vessel to 75° C., a cyclohexane solution containing 2 parts by weight of styrene and 22 parts by weight of 1,3-butadiene was continuously added for 35 minutes and polymerized at 75° C. and furthermore, a cyclohexane solution containing 38 parts by weight of styrene was added and polymerized at 75° C. for 25 minutes. Thereafter, the polymerization was stopped by adding methanol in an amount of 0.9-fold mol based on the n-butyllithium to the polymerization vessel and after adding 0.6 parts by weight of 2-[1-(2-hydroxy-3,5-di-tert-pentylphenyl)ethyl]-4,6-di-tert-pentylphenyl acrylate as the stabilizer per 100 parts by weight of the block copolymer composition, the solvent was removed to obtain a block copolymer.

(3) Block Copolymers A-2 to A-5

Block Copolymers A-2 to A-5 were prepared in the same manner as A-1. In the case where the block styrene had a plurality of peak molecular weights, the peak molecular weight was adjusted by controlling the weight ratio of the first and second styrene homopolymerization parts.

<Preparation of Styrene/n-Butyl Acrylate Copolymers B-3 and B-4>

In a 10 liter-volume autoclave with a stirrer, 5 kg of styrene and n-butyl acrylate at a ratio shown in Table 2 was added and at the same time, 0.3 kg of ethylbenzene and a predetermined amount of 1.1-bis(tert-butylperoxy)cyclohexane for adjusting MFR were charged. After the polymerization at 110 to 150° C. for 2 to 10 hours, unreacted styrene and n-butyl acrylate were recovered by a bent extruder, whereby Styrene/n-Butyl Acrylate Copolymers B-3 and B-4 were produced. MFR of the obtained B-3 was 3.0 g/10 min, and MFR of B-4 was 2.6 g/10 min.

<Measurement-Evaluation Methods>

The measurements and evaluations in Examples and Comparative Examples were performed by the following methods.

(1) Styrene Content

As for the styrene content of the block copolymer or the sheet, about 40 mg of the block copolymer or sheet was precisely weighed and dissolved in 100 ml of chloroform, and the absorbance of the styrene moiety in the solution after dissolution was measured by an ultraviolet spectrophotometer (name of apparatus: UV-2450, manufactured by Shimadzu Corporation). Thereafter, from the calibration curve of the absorbance and the weight of styrene, the styrene content in the block copolymer or sheet was determined.

(2) Block Styrene Content

The block styrene content was measured by a method of oxidatively decomposing the block copolymer or sheet with tert-butyl hydroperoxide by using osmium tetroxide as the catalyst (the method described in I. M. KOLTHOFF, et al., J. Polym. Sci., 1, 429 (1946)).

(3) Peak Molecular Weight of Block Styrene

The vinyl aromatic hydrocarbon polymer block component obtained in (2) above was dissolved in a tetrahydrofuran solvent, and the molecular weight was determined in a usual manner by using gel permeation chromatography (GPC). As for the peak molecular weight, a polydisperse polystyrene for GPC was measured by GPC and from the chromatographic chart based on the calibration curve of the peak count number and the number average molecular weight of the monodisperse polystyrene, the peak molecular weight was read and determined.

(4) Half-Width of Block Styrene Molecular Weight Distribution Curve

The molecular weight in the molecular weight distribution chart used for the determination of peak molecular weight in (3) above was taken, in the logarithmic indication, on the abscissa by assigning a length of 15 cm to the range from 1,000 to 1,000,000, and the width on the abscissa of the peak at 50% of the peak top height was determined (unit: cm).

(5) Number Average Molecular Weight

The molecular weight of the block copolymer was measured by using a GPC apparatus (manufactured by Waters Corporation, U.S.A.). The measurement was performed at 35° C. by using tetrahydrofuran as the solvent. The number average molecular weight was determined with use of a calibration curve prepared by using a commercially available polystyrene having a known weight average molecular weight and a known number average molecular weight.

(6) Tensile Modulus

The tensile modulus was measured with respect to the MD direction of the sheet at a pulling rate of 5 mm/min according to JIS K-6732. The test piece had a width of 12.7 mm and the bench mark distance was 50 mm. The measurement was performed at 23° C. The unit is $kg/cm^2$.

(7) Dart Impact Strength

The dart impact strength was measured according to ASTM D1709-72. The unit is Kg·cm. A falling weight having a radius of ½ inch was used.

(8) Haze

A liquid paraffin was coated on the sheet surface, and the haze was measured according to ASTM D1003.

(9) Heating Shrinkability

The sheet was cut into 10 cm×10 cm (MD×TD) and left standing in a gear oven under the conditions of 130° C.×30 min and thereafter, the shrinkage percentage in the MD direction was measured.

(Criteria)
G: Within 25%.
P: Over 25%.

(10) Thermal Stability

With respect to the sheets shown in Table 3, a sheet having a thickness of 0.3 mm was continuously shaped for 6 hours by using a 40-mm sheet extruder under the condition of an extrusion temperature of 240° C. The number of FE in a size of 0.5 mm or more per area of 300 $cm^2$ was counted on each of the sheets 5 minutes and 6 hours after the start of operation, and the thermal stability was evaluated by the difference in the number of FE between those two sheets.

(Criteria)
G: Within 100 FE.
P: Over 100 FE.

Examples 1 to 6 and Comparative Examples 1 to 4

A composition comprising a block copolymer (A-1 to A-6), other polymer [B-5 (Tufprene 126, produced by Asahi Kasei Corp., a styrene-butadiene-based block copolymer) and B-6 (Tuftec 1041, produced by Asahi Kasei Corp., a styrene-butadiene-based hydrogenated block copolymer)], a styrene/n-butyl acrylate copolymer (B-3 and B-4), a general-purpose polystyrene [B-2 (PSJ Polystyrene 685, produced by PS Japan Corp.)], and a rubber-modified styrene polymer [B-1 (PSJ Polystyrene 475D, produced by PS Japan Corp.)], of which kind and amount are shown in Table 3, was shaped into a sheet form at 200° C. to a thickness of 0.6 mm at a withdrawal rate of 1.4 m/min by using a 40-mm extruder, thereby obtaining sheets of Examples and Comparative Examples. The analysis values and physical properties of each of the sheets obtained are shown in Table 3. It is seen that the sheet of the present invention is excellent in the rigidity in terms of tensile modulus, the impact resistance in terms of dart impact strength, the transparency in terms of haze, the heat shrinkability and the thermal stability. The physical properties of the sheet shown in Table 3 were determined by the methods described above.

[Table 1]

TABLE 1

| | Styrene Content (wt %) | Butadiene/ Isoprene (weight ratio) | Number Average Molecular Weight | Block Styrene Content (wt %) | Peak Molecular Weight of Block Styrene | Half-Width of Molecular Weight Distribution Curve of Block Styrene |
|---|---|---|---|---|---|---|
| A-1 | 73 | 25/75 | 127000 | 58 | (1) 37000 | 1.9 |
| A-2 | 81 | 40/60 | 132000 | 70 | (1) 37000 (2) 54000 | 2.5 |
| A-3 | 77 | 60/40 | 136000 | 63 | (1) 38000 | 2.0 |
| A-4 | 75 | 100/0 | 136000 | 71 | (1) 10000 (2) 86000 | (1) 1.2 (2) 2.8 |
| A-5 | 92 | 100/0 | 140000 | 85 | (1) 13000 (2) 99000 | (1) 1.3 (2) 3.0 |
| A-6 | 78 | 25/75 | 131000 | 76 | (1) 49000 | 1.2 |

[Table 2]

TABLE 2

| | Styrene Content (wt %) |
|---|---|
| B-1 | 94 |
| B-2 | 100 |
| B-3 | 79 |
| B-4 | 88 |

B-1: PSJ Polystyrene 475D (produced by PS Japan Corp.)
B-2: PSJ Polystyrene 685 (produced by PS Japan Corp.)
B-3 and B-4: Styrene/n-butyl acrylate copolymer

[Table 3]

TABLE 3

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Blended Composition | Kind and amount of block copolymer (A) (wt %) | A-1 65 | A-2 85 | A-3 50 | A-3 60 | A-1 50 | A-2 80 | A-4 60 | A-5 80 | A-1 10 | A-6 70 |
| | Kind and amount of styrene-based polymer (wt %) | B-1/B-2 15/20 | B-1/B-2 5/10 | B-1/B-2 10/40 | B-1/B-3 10/30 | B-1/B-4 5/42 | B-1/B-2 7/10 | B-1/B-2 10/30 | B-1/B-2 3/17 | B-1/B-2 20/70 | B-1/B-2 10/20 |
| | Kind and amount of other polymer (wt %) | — — | — — | — — | — — | B-5 3 | B-6 3 | — — | — — | — — | — — |
| Sheet | Styrene content (wt %) | 82 | 84 | 88 | 79 | 79 | 82 | 84 | 93 | 96 | 84 |
| | Content of styrene polymer component (wt %) | 72 | 74 | 81 | 71 | 72 | 74 | 83 | 88 | 95 | 83 |
| | Tensile modulus (Kg/cm$^2$) | 22000 | 20200 | 22500 | 31600 | 23100 | 20600 | 23500 | 29500 | 30200 | 24300 |
| Physical Properties of Sheet | Dart impact strength (Kg·cm) | 26 | 21 | 25 | 29 | 19 | 22 | 16 | 4 or less | 4 or less | 11 |
| | Haze (%) | 2.4 | 2.2 | 7.4 | 1.9 | 2.6 | 2.9 | 2.3 | 1.3 | 1.8 | 2.2 |
| | Heat shrinkability | G | G | G | G | G | G | P | P | G | G |
| | Thermal stability | G | G | G | G | G | G | P | P | G | G |

B-5: Tufprene 126 (produced by Asahikasei Chemicals Corp.)
B-6: Tuftec 1041 (produced by Asahikasei Chemicals Corp.)

While the invention has been described in detail and with reference to specific embodiments thereof, it will be apparent to one skilled in the art that various changes and modifications can be made therein without departing from the spirit and scope thereof.

This application is based on a Japanese patent application filed on Aug. 22, 2003 (Patent Application 2003-298214), the contents of which are incorporated herein by reference.

INDUSTRIAL APPLICABILITY

The sheet suitable for a carrier tape of the present invention is transparent and excellent in the balance of physical properties such as rigidity, impact resistance and heat shrinkability, and therefore, can be suitably used for a carrier tape for packaging an electronic component (e.g., IC, LSI) in an electronic device.

The invention claimed is:

1. A sheet for a carrier tape, having at least one layer comprising (I) a block copolymer comprising a vinyl aromatic hydrocarbon and a conjugated diene, (II) a non-rubber-modified vinyl aromatic hydrocarbon polymer, and (III) a rubber-modified vinyl aromatic hydrocarbon polymer, wherein the vinyl aromatic hydrocarbon polymer block in the block copolymer (I) has a peak molecular weight of from 30,000 to 80,000, and said vinyl aromatic hydrocarbon block has a half-width in its molecular weight distribution curve of from 1.3 to 2.8, said sheet for a carrier tape has a vinyl aromatic hydrocarbon content of from 75 to 95 wt % and a vinyl aromatic hydrocarbon polymer component content of from 65 to 85 wt %.

2. The sheet for a carrier tape as claimed in claim 1, wherein the peak molecular weight of the vinyl aromatic hydrocarbon polymer block in the block copolymer (I) is from 32,000 to 75,000, the half-width in the molecular weight distribution curve of said vinyl aromatic hydrocarbon block is from 1.5 to 2.5, the vinyl aromatic hydrocarbon content in the sheet for a carrier tape is from 77 to 92 wt %, and the content of the vinyl aromatic hydrocarbon polymer component is from 68 to 82 wt %.

3. The sheet for a carrier tape as claimed in claim 1, wherein the contents of the block copolymer (I), the nonrubber-modified vinyl aromatic hydrocarbon polymer (II) and the rubber-modified vinyl aromatic hydrocarbon polymer (III) are, assuming that the total is 100 parts by weight, from 30 to 90 parts by weight, from 5 to 60 parts by weight, and from 1 to 30 parts by weight, respectively.

4. The sheet for a carrier tape as claimed in claim 1, wherein the block copolymer (I) has a vinyl aromatic hydrocarbon content of from 65 to 90 wt % and a conjugated diene content of from 10 to 35 wt %.

5. The sheet for a carrier tape as claimed in claim 1, wherein the conjugated diene of the biock copolymer (I) comprises butadiene and isoprene, and the weight ratio of the butadiene and the isoprene is from 10/90 to 80/20.

6. The sheet for a carrier tape as claimed in claim 1, wherein the non-rubber-modified vinyl aromatic hydrocarbon polymer (II) is a styrene/n-butyl acrylate copolymer (IV) having a styrene monomer unit content of 75 to 90 wt % and an n-butyl acrylate monomer unit content of 25 to 10 wt %.

7. A carrier tape formed of the sheet claimed in claim 1.

* * * * *

UNITED STATES PATENT AND TRADEMARK OFFICE
CERTIFICATE OF CORRECTION

| | |
|---|---|
| PATENT NO. | : 7,268,186 B2 |
| APPLICATION NO. | : 10/569052 |
| DATED | : September 11, 2007 |
| INVENTOR(S) | : Susumu Hoshi et al. |

It is certified that error appears in the above-identified patent and that said Letters Patent is hereby corrected as shown below:

Column 17, Line 11, change "biock" to --block--.

Signed and Sealed this

Twenty-fifth Day of December, 2007

JON W. DUDAS
*Director of the United States Patent and Trademark Office*